Sept. 6, 1932.  G. C. BINGHAM  1,875,980

MACHINE FOR PLUCKING BIRDS

Filed Dec. 15, 1928  3 Sheets-Sheet 1

INVENTOR
GEORGE C. BINGHAM
BY Richards & Geier
ATTORNEYS

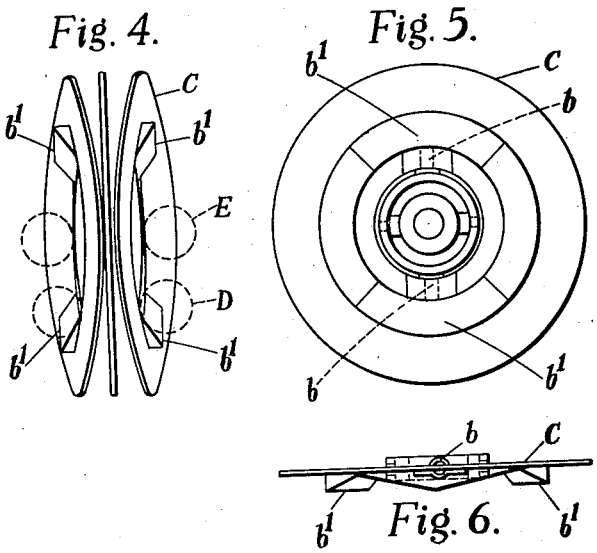

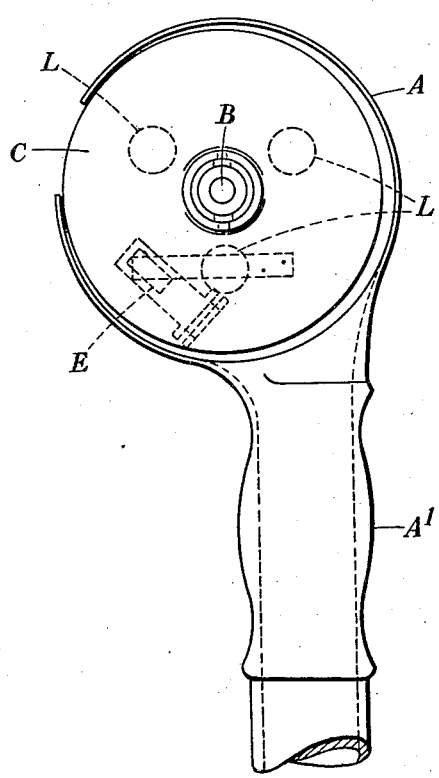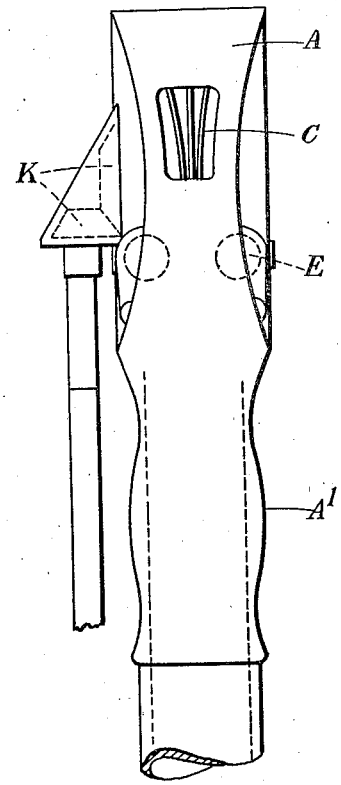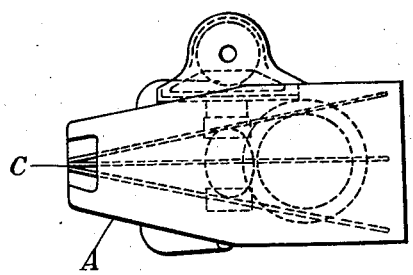

Patented Sept. 6, 1932

1,875,980

UNITED STATES PATENT OFFICE

GEORGE COWLEY BINGHAM, OF MALDON, ENGLAND

MACHINE FOR PLUCKING BIRDS

Application filed December 15, 1928, Serial No. 326,216, and in Great Britain November 23, 1927.

My invention embraces a machine for removing the feathers, down and stubs from the carcasses of birds comprising a number of spaced discs having a common axis, and adapted to be so guided or deflected that their peripheral edges are caused to gradually approach one another and meet to grip at a predetermined point, and then to recede to release, one or more times during each revolution.

Such discs may be formed of rigid plates mounted on gymbals or other type of coupling on a common axle so that they may be deflected to cause their peripheral edges to approach one another and recede as required.

The deflection of the discs may be effected by rollers acting on cam surfaces on the faces of the two outermost discs or equivalent means may be employed to cause such deflection, and such control is adapted to cause the peripheral edges of the discs to touch through a predetermined arc.

At or near the point where the discs touch one another is fixed a plate or stripping bar the edge of which crosses the peripheries of the discs so that feathers gripped by the discs will be pulled against such bar and detached.

In operation the bird to be plucked is passed over the stripping bar so that the feathers project over the bar into the spaces between the discs, and as the bird is passed down over the stripping bars the feathers reach a point where they are nipped between the discs, which latter, continuing to rotate, pull the feathers over the stripping bar and immediately afterwards release them as the discs separate.

A grid or fence may be employed to cover the edges of the discs above the stripping bar to allow the feathers to enter without danger to the operator, while the edges of the discs may be notched or gapped so that too many feathers will not be gripped at one time and result in the skin of the bird being plucked being torn, and said edges may be roughened or otherwise prepared to enable them to firmly hold the feathers gripped.

Plucking machines so constructed are illustrated by the accompanying drawings, and I will further describe my invention and its practical application by the aid of such illustrations.

Figure 1:
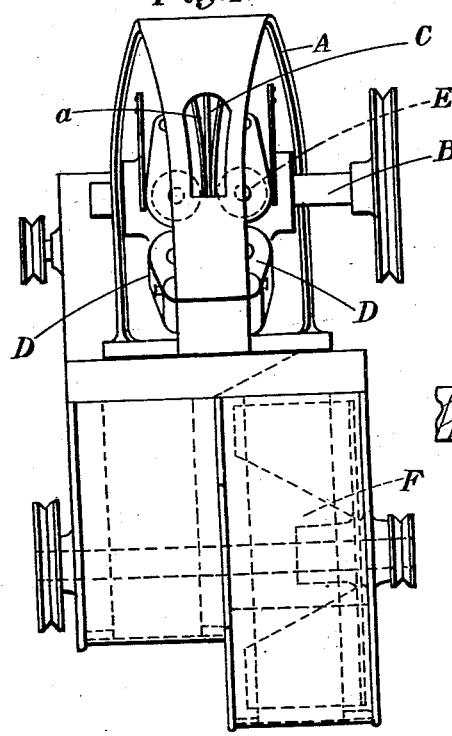
Figure 2:
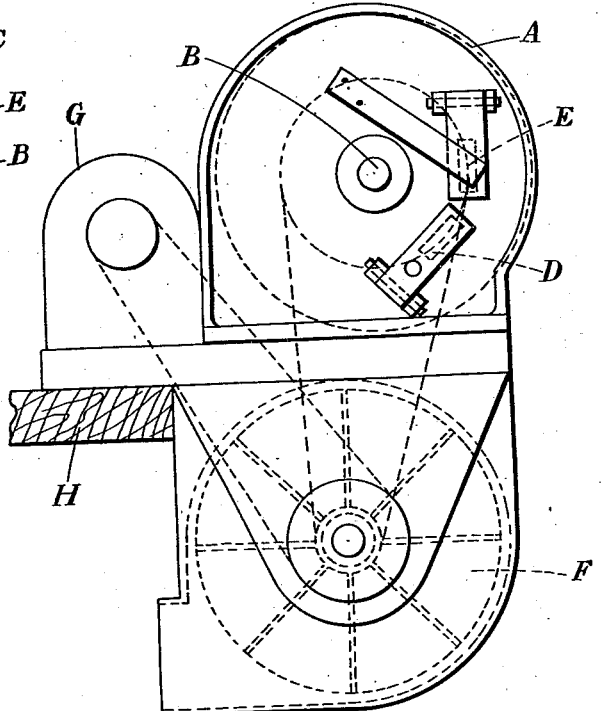
Figure 3:
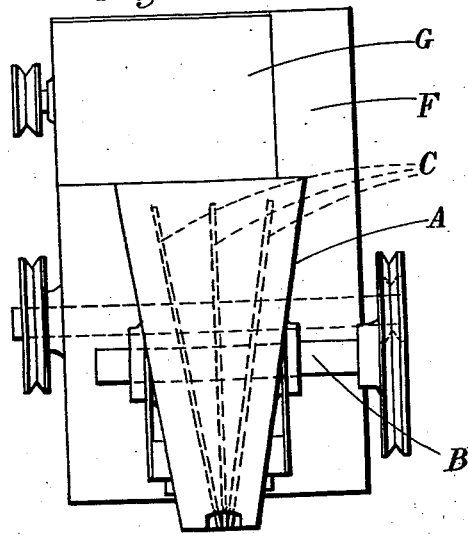
Figure 7:
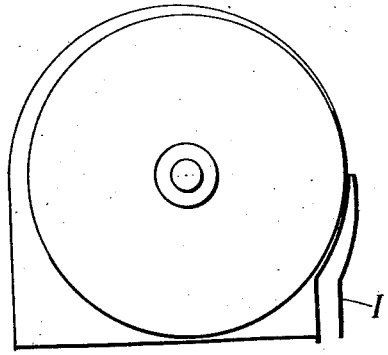

Of these drawings Figure 1 is a front elevation, Figure 2 a side elevation, and Figure 3 a plan of a plucking machine constructed according to my invention, adapted to be fixed to a bench and to be driven by an electric motor, while Figures 4 and 5 show a front view and side view respectively of the discs thereof detached, and Figures 6 and 7 respectively a plan of one of the outermost discs, and a side elevation of the central disc with an air nozzle.

Figures 8, 9, and 10 show a side elevation, front elevation and plan respectively of a modified plucking machine adapted to be held in the hand and passed over the bird to be plucked.

As shown in Figures 1, 2, 3, 4, 5, and 6, the machine comprises a suitable frame or cover A across which a shaft B is journalled. On this shaft three plucking discs C are mounted with a suitable space between them, the central one being fixed to the shaft while the outer two are mounted on gymbals $b$ (shown in Figures 5 and 6 and comprising two pivoting axles at right angles to one another) so that they may be deflected as required.

Each of these outer discs is provided with a cam surface $b^1$ on its outer face and these cam surfaces are adapted to be engaged by fixed rollers D and spring weighted rollers E which are so placed that as the discs rotate the cam surfaces first engage the spring weighted rollers and so deflect the discs as to cause their peripheral edges to gradually approach and ultimately to press against that of the central disc and they will be so held together through a suitable arc by the cam surfaces engaging the fixed rollers as they disengage the spring weighted rollers, but will recede as the cam surfaces disengage the fixed rollers.

The peripheral edges of the discs are thus caused to grip and hold and then release the feathers of a bird presented to them at a point predetermined by the positions of the rollers D and E and this point, as shown, occurs at the front of the machine where an opening $a$ is formed in the frame or cover A, the lower edges of which opening constitute a plucking bar against which the bird being plucked is held as the feathers thereof are gripped and extracted by the plucking discs.

The frame or cover A is combined with that of a fan F and a motor G, while the whole is adapted to be secured to a bench or support H. The interior of the cover A communicates with that of the fan F and the latter is so arranged as to draw the feathers from the cover A as they are released by the plucking discs, and eject them through an outlet $f$ to which a bag may be attached.

The spindle of the fan F is driven by the motor G and the shaft B of the plucking discs is driven from the fan spindle.

Where desired an air nozzle I (Figure 7) may be arranged under the plucking point through which a blast of air from the fan or other source passes and so roughens up the small light feathers during plucking.

In the modification shown in Figures 8, 9, and 10, the machine is designed to be held in the hand and passed over the bird to be plucked instead of the bird being held to the machine as above described with reference to Figures 1 to 7.

In this modified construction the plucking discs are mounted on a common axle B as previously described and this axle is journalled in a frame or cover A having a tubular extension $A^1$ by which it may be held in the hand and through which the interior of the cover A may be connected by a flexible tubing to a suction fan for collecting the feathers.

The shaft B is driven through bevel gearing K by a flexible drive of suitable type, and the plucking discs are deflected by spring weighted rollers E, but these instead of engaging cam surfaces on the faces of the outer discs as previously described, engage spring buffers L thereon of rubber or other suitable form. The use of such deflecting means is preferable in a machine of this type as the discs employed are small.

I declare that what I claim is:—

1. In a machine for plucking birds, a plurality of spaced co-axial discs, means for rotating said discs, means for tilting adjacent discs during the rotation thereof relatively to each other so as to cause the margins of those discs to approach each other in the direction of rotation of the discs to grip between them the feathers on the carcasses of birds and then, after a predetermined arcuate movement in such gripping position, to recede to release said feathers, a casing within which the discs are arranged, and suction means for extracting from said casing the feathers released by the discs.

2. In a machine for plucking birds, a plurality of spaced co-axial discs, means for rotating said discs, roller-and-cam means operating during the rotation of the discs to tilt adjacent discs relatively to each other, at least once during each revolution of the discs, so as to cause the margins of those discs to approach each other in the direction of rotation of the discs to grip between them the feathers on the carcasses of birds and then, after a predetermined arcuate movement in such gripping position, to recede to release the feathers, a casing within which the discs are arranged, and suction means for extracting from said casing the feathers released by the discs.

3. In a machine for plucking birds, a shaft, means to rotate said shaft, a plurality of spaced discs mounted on said shaft and rotating therewith, universal couplings connecting at least one of each pair of adjacent discs to said shaft to permit that disc to tilt relatively to the shaft, means operating during the rotation of the discs to tilt the tiltable discs so as to cause the margins of those discs to approach each other in the direction of rotation of the discs to grip between them at a predetermined location, the feathers on the carcasses of birds presented to the edges of the discs at the said location and then, after a predetermined arcuate movement in such gripping position, to recede to release said feathers, a casing within which the discs are arranged, and suction means for extracting from said casing the feathers released by the discs.

4. In a machine for plucking birds, a plurality of spaced co-axial discs, means for rotating said discs, cams on some of the discs, rollers engaging said cams as the discs rotate to cause adjacent discs to tilt relatively to each other so as to move the margins of adjacent discs towards each other in the direction of rotation of the discs to grip between them at a predetermined location feathers on the carcasses of birds presented to the edges of the discs at the said location and then, after a predetermined arcuate movement in such gripping position, to recede to release the feathers, a casing within which the discs are arranged, and suction means for extracting from said casing the feathers released by the discs.

In testimony whereof I have affixed my signature.

GEORGE COWLEY BINGHAM.